United States Patent [19]

Deguchi

[11] Patent Number: 5,113,225
[45] Date of Patent: May 12, 1992

[54] OPTICAL SYSTEM DRIVING DEVICE

[75] Inventor: Masanobu Deguchi, Kita-Katsuragi, Japan

[73] Assignee: Sharp Kabushiki Kaisha, Osaka, Japan

[21] Appl. No.: 645,845

[22] Filed: Jan. 25, 1991

[30] Foreign Application Priority Data

Jan. 25, 1990 [JP] Japan .................................. 2-16602
Feb. 20, 1990 [JP] Japan .................................. 2-40540

[51] Int. Cl.⁵ .............................................. G03G 15/04
[52] U.S. Cl. ............................................ 355/235; 355/233
[58] Field of Search ................... 355/235, 200, 47, 66, 355/233; 358/497

[56] References Cited

U.S. PATENT DOCUMENTS 4,073,584 2/1978 Kitajima ............................. 355/235
4,407,581 10/1983 Shogren et al. ...................... 355/235

FOREIGN PATENT DOCUMENTS 61-32046 2/1986 Japan ................................. 355/235

*Primary Examiner*—Joan H. Pendegrass
*Attorney, Agent, or Firm*—David G. Conlin; Robert M. Asher

[57] ABSTRACT

An optical system driving device comprising: a lamp unit which emits an optical beam for scanning an object and moves with respect to the object; a photosensitive member which receives a reflection light reflected from the object; a mirror unit which is disposed on an optical path between the lamp unit and the photosensitive member for guiding the reflection light to the photosensitive member and moves at a predetermined speed ratio with respect to the lamp unit; and a rack-pinion means connected to the lamp unit and the mirror unit to move the units at the predetermined speed ratio. Thereby it becomes possible to simplify the structure of the device and easily adjust the relative position between the lamp unit and the mirror unit at the time of assembling the device. Also, the speed ratio between the lamp unit and the mirror unit can be easily adjusted to be a predetermined ratio.

10 Claims, 11 Drawing Sheets

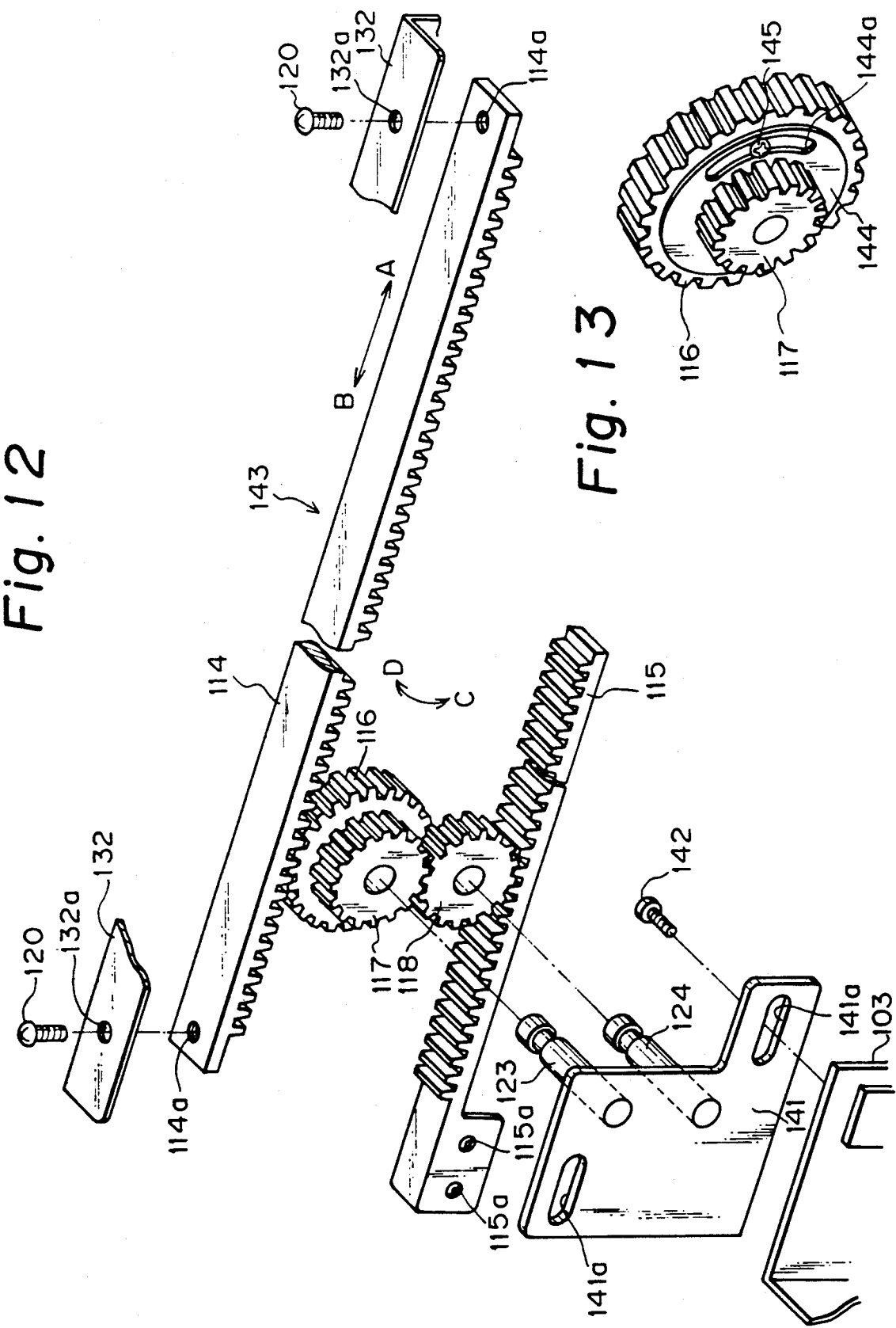

OPTICAL SYSTEM DRIVING DEVICE

BACKGROUND OF THE INVENTION

1. Field of the Invention

The present invention relates to a driving device for an optical system which device is suitably applied to an optical system of, for example, a copying apparatus comprising a light source lamp unit and a mirror base unit which are driven at a predetermined speed ratio with respect to each other.

2. Description of the Related Art

An optical system driving device that is related to an art of the present invention is disclosed in U.S. Pat. No. 4,073,584.

In accordance with the related art structure, the mirror unit on which mirrors are mounted is driven with the use of wires through a number of pulleys and rollers connected to a drive source, which makes the whole structure very complicated.

Also, producing the device by assembling the parts is troublesome and costly. Besides, extension or loosening of the wire causes the degradation of driving control accuracy. Further, it is not easy to adjust the relative position between the lamp unit and the mirrors.

SUMMARY OF THE INVENTION

The present invention was made considering the above mentioned problems of the related art.

It is therefore an object of the present invention to provide an optical system driving device which is simplified in construction and easy to adjust the relative position between the optical elements when assembling the device.

The above mentioned object of the present invention can be achieved by an optical system driving device comprising:

a lamp unit which emits an optical beam for scanning an object and moves with respect to the object;

a photosensitive member which receives a reflection light reflected from the object;

a mirror unit which is disposed on an optical path between the lamp unit and the photosensitive member for guiding the reflection light to the photosensitive member and moves at a predetermined speed ratio with respect to the lamp unit; and a rack-pinion means connected to the lamp unit and the mirror unit to move the units at the predetermined speed ratio.

More particularly, the above mentioned object of the present invention can be achieved by an optical system driving device comprising: a light source lamp unit; a photoconductor drum; a mirror base unit which is disposed on an optical path between the lamp unit and the drum and driven at a predetermined speed with respect to the lamp unit when the optical system is operated; a stationary rack gear secured to a device frame; a movable rack gear attached to the mirror base unit; a first planetary gear which engages with the stationary rack gear; a second planetary gear which is arranged in such a way that the pitch circle diameter ratio thereof with respect to the first planetary gear corresponds to the speed ratio thereof with respect to the first planetary gear and that the second gear is coaxial and rotates with the first gear as one unit; and an idle gear which is disposed between and engages with the second planetary gear and the movable rack gear, wherein a rotary shaft for the planetary gears and a rotary shaft for the idle gear are connected to the lamp unit as a part of the unit body.

In accordance with the above mentioned structure, it becomes possible to drive the lamp unit and the mirror base unit at a predetermined speed ratio with respect to each other without using wires for driving the units.

Therefore, it becomes possible to reduce the number of parts and make it easy to assembe, which reduces the cost thereof in comparison to the structure wherein wires and a number of pulleys are used.

The above mentioned object of the present invention can also be achieved by an optical system driving device comprising: a light source lamp unit; a photoconductor member; a mirror base unit which is disposed on an optical path between the lamp unit and the member and driven at a predetermined speed with respect to the lamp unit when the optical system is operated; a stationary rack gear secured to a device frame; a movable rack gear attached to the mirror base unit; a first planetary gear which engages with the stationary rack gear; a second planetary gear which is arranged in such a way that the gear ratio thereof is different from that of the first planetary gear and that the second gear is coaxial and rotates with the first gear as one unit; and an idle gear which is disposed between and engages with the second planetary gear and the movable rack gear, wherein a rotary shaft for the planetary gears and a rotary shaft for the idle gear are connected to the lamp unit as a part of the unit body.

In accordance with the above mentioned arrangement of the present invention, it becomes possible to simplify the structure and make it easy to adjust the speed ratio between the lamp unit and the mirror base unit by adjusting the gear ratio between the first and second planetary gears.

Also, it becomes possible to easily adjust the optical path length by adjusting the position of the stationary rack gear with respect to the device frame, the position of the movable rack gear with respect to the mirror base unit, or the positions of gears with respect to the lamp unit. Or otherwise, the optical path length can be adjusted by adjusting the relative rotational position between the first and second planetary gears by rotating the gears with respect to each other after the device is assembled. Besides, the above mentioned adjusting operation can be easily and reliably achieved observing the motion of the optical elements of the device.

Therefore, an advantage of the present invention is that it becomes possible to easily set the speed ratio between the lamp unit and the mirror unit with the simplified structure thereof.

Also, another advantage of the present invention is that it becomes possible to easily adjust the optical path length for focusing the original image while observing the movement of the optical elements of the device.

Further objects and advantages of the present invention will be apparent from the following description of the preferred embodiments of the invention as illustrated in the accompanying drawings.

BRIEF DESCRIPTION OF THE DRAWINGS

FIG. 12 is an explosive view of a main portion of the optical system in accordance with a still further embodiment of the present invention; and FIG. 13 is a perspective view of a planetary gear used in the optical driving system in accordance with a still further embodiment of the present invention.

DESCRIPTION OF THE PREFERRED EMBODIMENTS

Embodiments of the present invention are described below with reference to the drawings in detail and in comparison to the related art structure which is also described with reference to the drawings.

FIGS. 1 to 4 illustrate an optical system structure related to the present invention. The present invention is improved from the related art structure.

Figure 1:
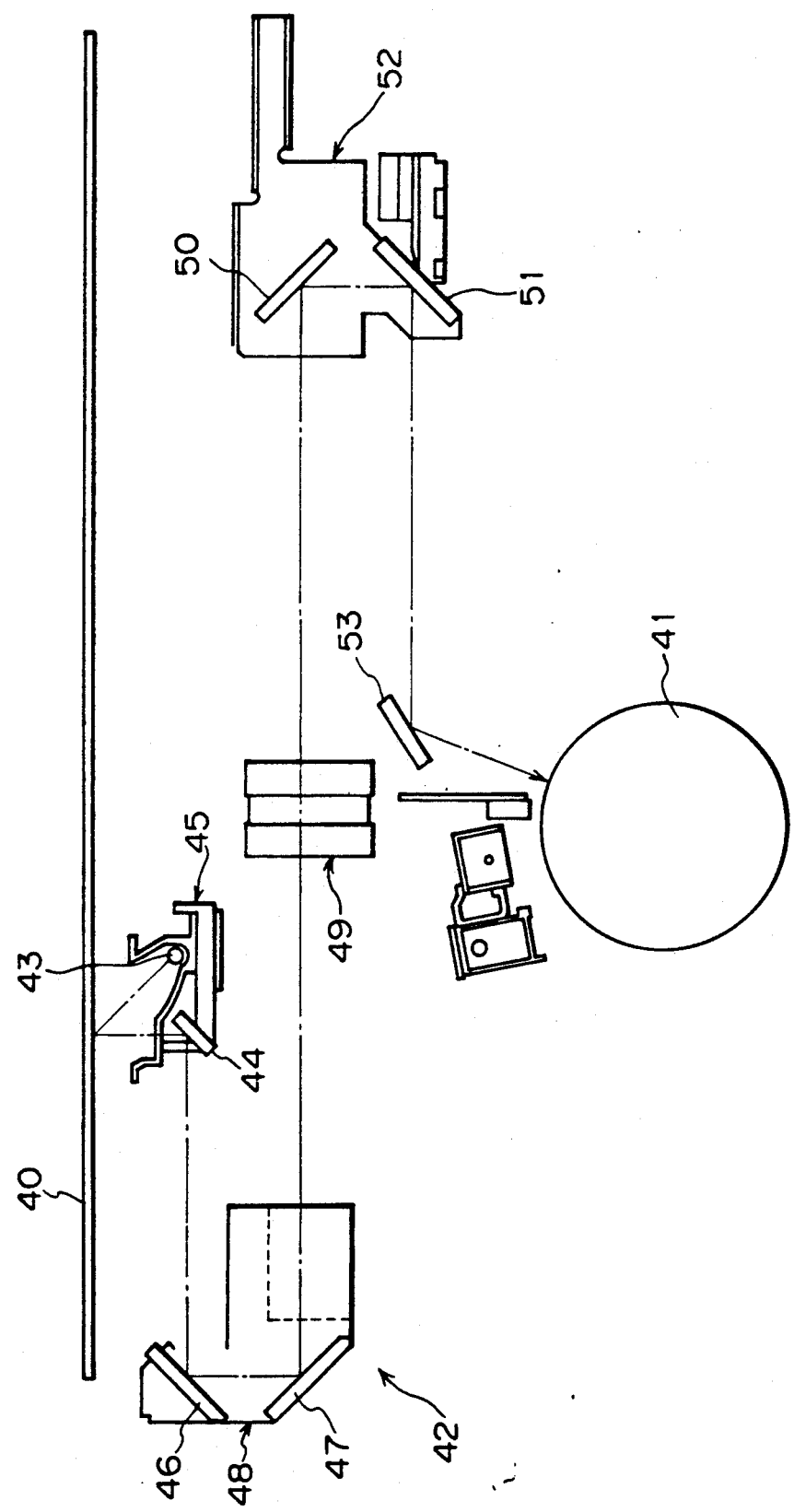
FIG. 1 is a constructional view of an optical system in accordance with the related art.
Figure 2:
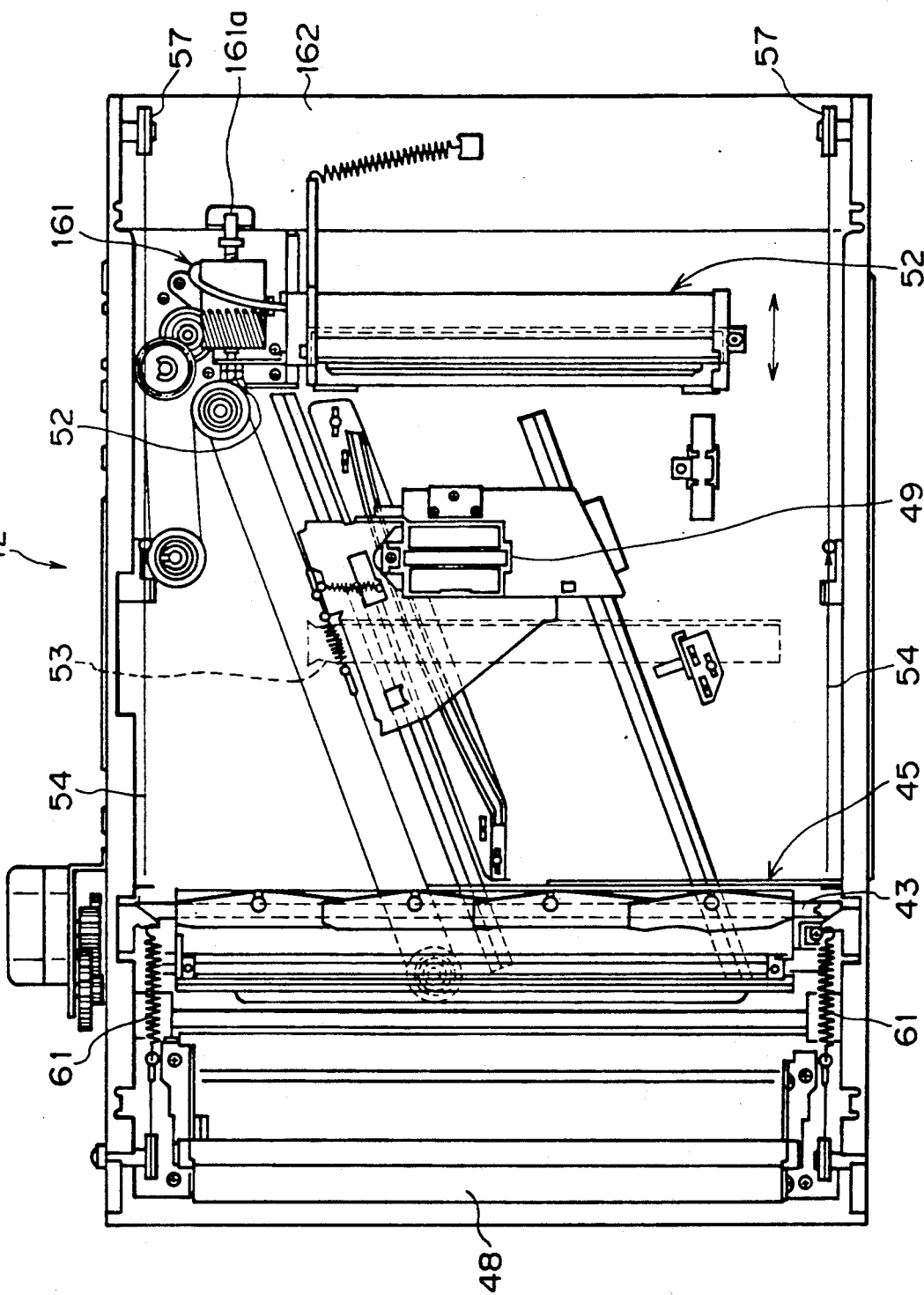
FIG. 2 is a plan view of the optical system of FIG. 1.

FIG. 1 is a constructional view of an example of an copying apparatus of an original carrier fixed type and FIG. 2 is a plan view thereof. An original (not shown) to be copied is placed on an original carrier 40. The copying apparatus comprises an optical system which is designated by numeral 42 as a whole. The optical system 42 functions in such a way that it irradiates light to the original placed on the carrier 40 and guides the reflection light reflected from the original to a photoconductor drum 41. The optical system 42 comprises a lamp unit 45 which has a lamp 43 for using as a light source and a first mirror 44 mounted thereon. The lamp unit 45 scans the original and the reflection light is guided to the drum 41 through a mirror base unit 48 having a second mirror 46 and a third mirror 47 mounted thereon, a lens 49, a mirror holder 52 having a fourth mirror 50 and a fifth mirror 51 mounted thereon, and a sixth mirror 53.

The mirror base unit 48 is arranged to move at a speed as half as the lamp unit 45 so as to maintain the length of the optical path from the original carrier 40 to the lens 49 constant during the movement of the lamp unit 45. The mirror base unit 48 and the lamp unit 45 are secured to a wire 54 and driven to move by the wire 54 at a predetermined speed ratio therebetween.

Figure 3:
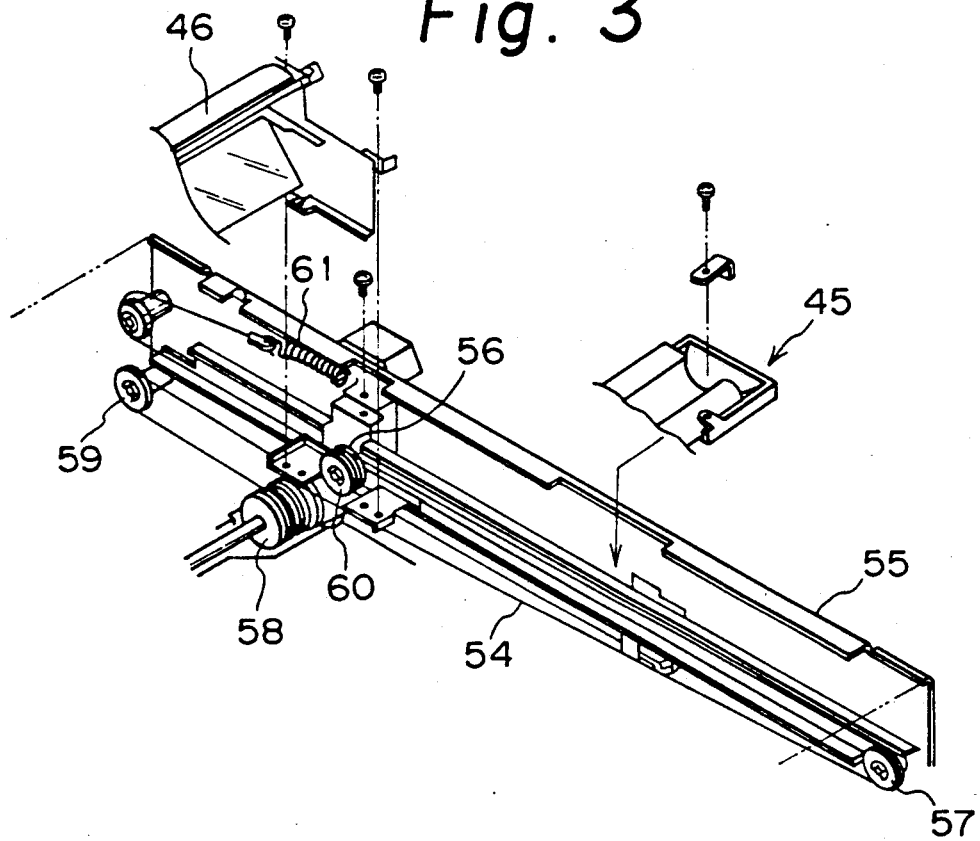
FIG. 3 is a perspective view of the driving mechanism of the optical system of FIG. 1.

FIG. 3 illustrates the driving mechanism portion of the copying apparatus mentioned above in detail including the wire 54, the mechanism constituting the optical system driving device according to the related art. An end of the wire 54 is attached to a frame 55 of the apparatus. The wire 54 is then stretched and arranged through around a pulley 56 of the mirror base unit 48 and an idle pulley 57 disposed at an end of the frame 55. The lamp unit 45 is secured to an intermediate portion of the wire 54. The wire 54 is further stretched from the pulley 57 to a drive pulley 58, wound around the pulley 58 and further stretched to another pulley 60 of the mirror base unit through an idle pulley 59 disposed at the other end of the frame 55. The wire is wound around the pulley 60, further stretched to the frame 55 and secured to the frame through a spring 61.

However, in accordance with the above mentioned structure of the driving device for the optical system of the copying apparatus, because of the arrangement of the wire 54, a number of pulleys are needed, which makes the structure complicated and troublesome to assemble the device and increases the cost thereof. Besides, it becomes necessary to consider the extension or loosening of the wire when arranging and driving the wire.

Also, the lens 49 of the optical system 42 mentioned above has a predetermined fixed focal length. The focal length of the optical system is adjusted first to arrange the optical path length from the original carrier 40 to the lends 49 to be set as a predetermined reference length. After that, the focal length is further adjusted by accurately arranging the imaging optical path length from the lens 49 to the photoconductor drum on which the latent image of original is formed.

Figure 4:
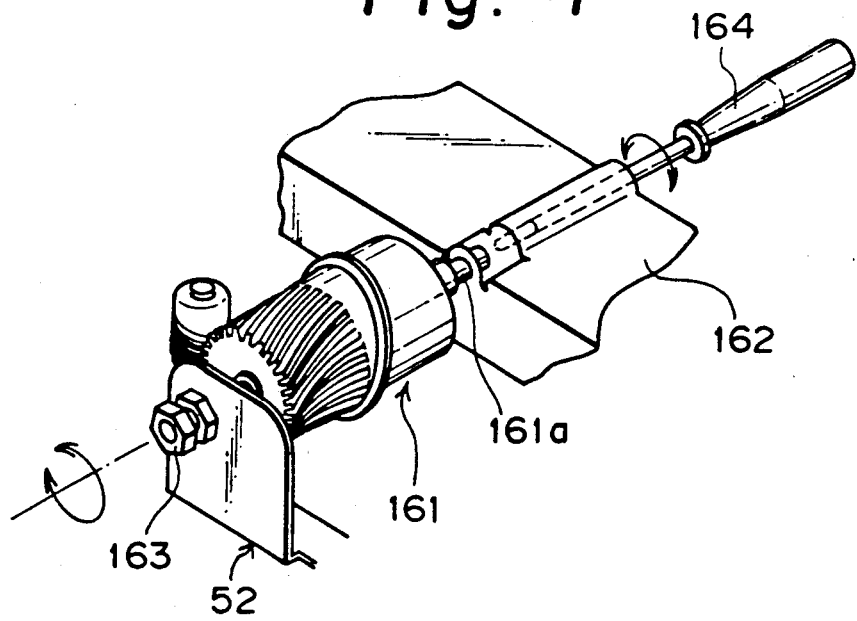
FIG. 4 is a perspective view of the cam means for adjusting the optical path length of the system of FIG. 1.

FIG. 4 illustrates a cam 161 for adjusting the imaging optical path length mentioned above. The optical path length is adjusted in such a way that the cam 161 is rotated to move the mirror holder 52 toward and away from the lens 49. The cam 161, as illustrated in FIG. 4, is disposed between the mirror holder 52 and the apparatus body 162 through a cam shaft 161a. Actually, the optical path length is adjusted in such a way that a nut 163 for fixing the shaft 161a to the mirror holder 52 is loosened first, after that, the cam 161 is rotated by a driver 164 from the side of the apparatus body 162.

However, in accordance with the above mentioned structure, the construction for setting the speed ratio between the lamp unit 45 and the mirror base unit 48 becomes complicated and it also becomes troublesome to adjust the relative position between the two units 45 and 48. Also, in accordance with the way for adjusting the optical path length mentioned above wherein the position of the mirror holder 52 is adjusted by rotating the cam 161 which is disposed at a corner of the optical system 42, it is not easy to carry out the adjusting operation since it is difficult to adjust the position while observing the movement of the mirror holder 52.

The above mentioned problems can be obviated by the embodiments of the present invention described below.

Figure 5:
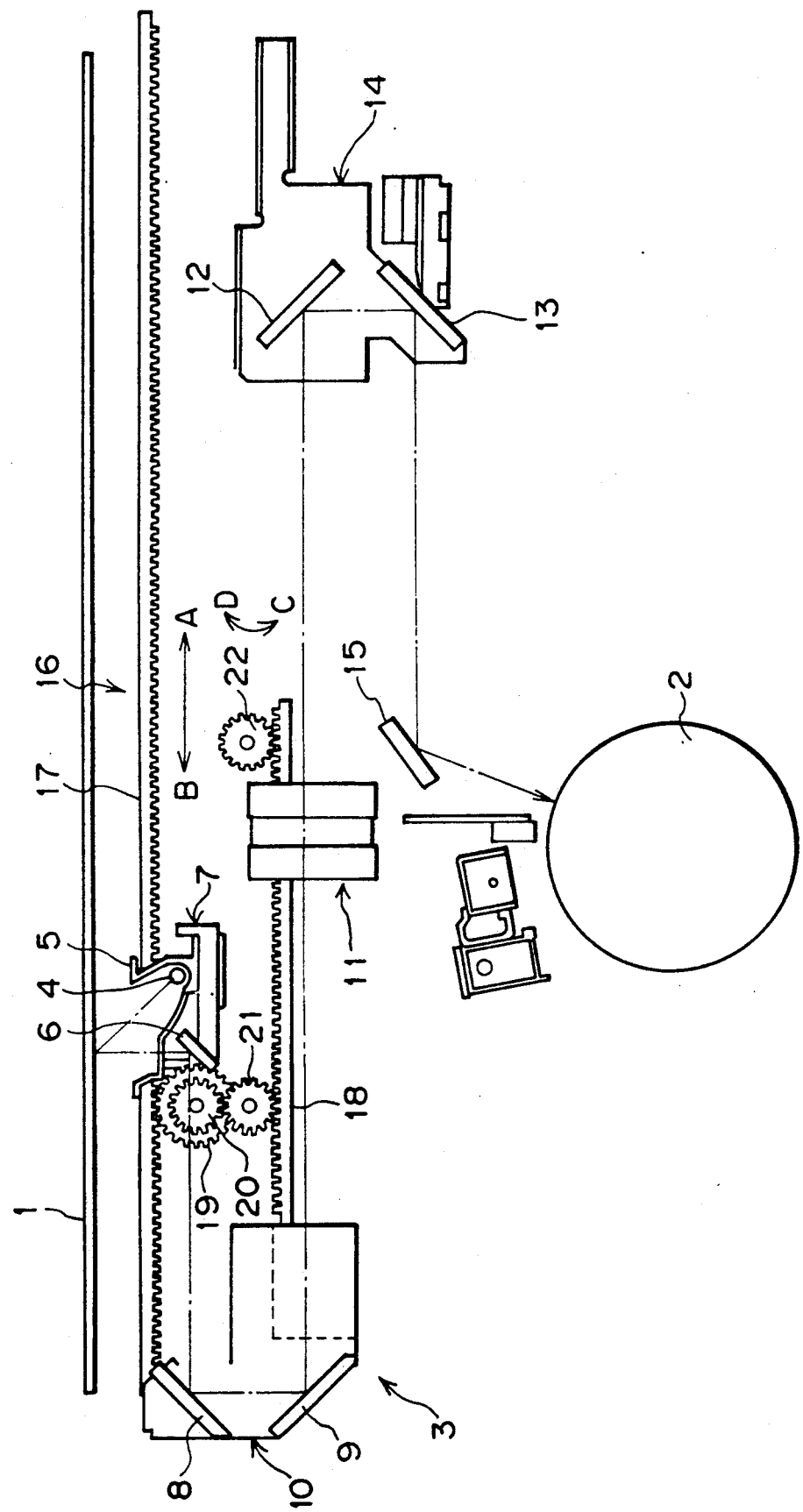
FIG. 5 is a constructional view of the optical system in accordance with an embodiment of the present invention.

FIG. 5 illustrates an optical system driving device of a copying apparatus in accordance with an embodiment of the present invention. And FIG. 6 illustrates the main driving mechanism of the device of FIG. 5.

The device comprises, as illustrated in FIG. 5, an original carrier 1, a photoconductor drum 2, and an optical system 3 which is disposed below the original carrier 1 and scans an original (not shown) placed on the carrier so that the reflection light reflected from the original is guided to the photoconductor drum 2. The optical system 3 comprises a light source lamp unit 7 having a lamp 4, a reflection plate 5 and a first mirror 6 mounted thereon, a mirror base unit 10 having a second mirror 8 and a third mirror 9 mounted thereon, a lens 11 of a fixed focal length type, a mirror holder 14 having a fourth mirror 12 and a fifth mirror 13 mounted thereon, and a sixth mirror 15.

The optical system 3 further comprises a driving mechanism 16 for driving the lamp unit 7 and the mirror base unit 10 at the time of scanning the original placed on the original carrier 1. The mirror base unit 10 is arranged to move at a speed as half as the lamp unit 7 in the same direction as the unit 7 as described in detail later.

Figure 6:
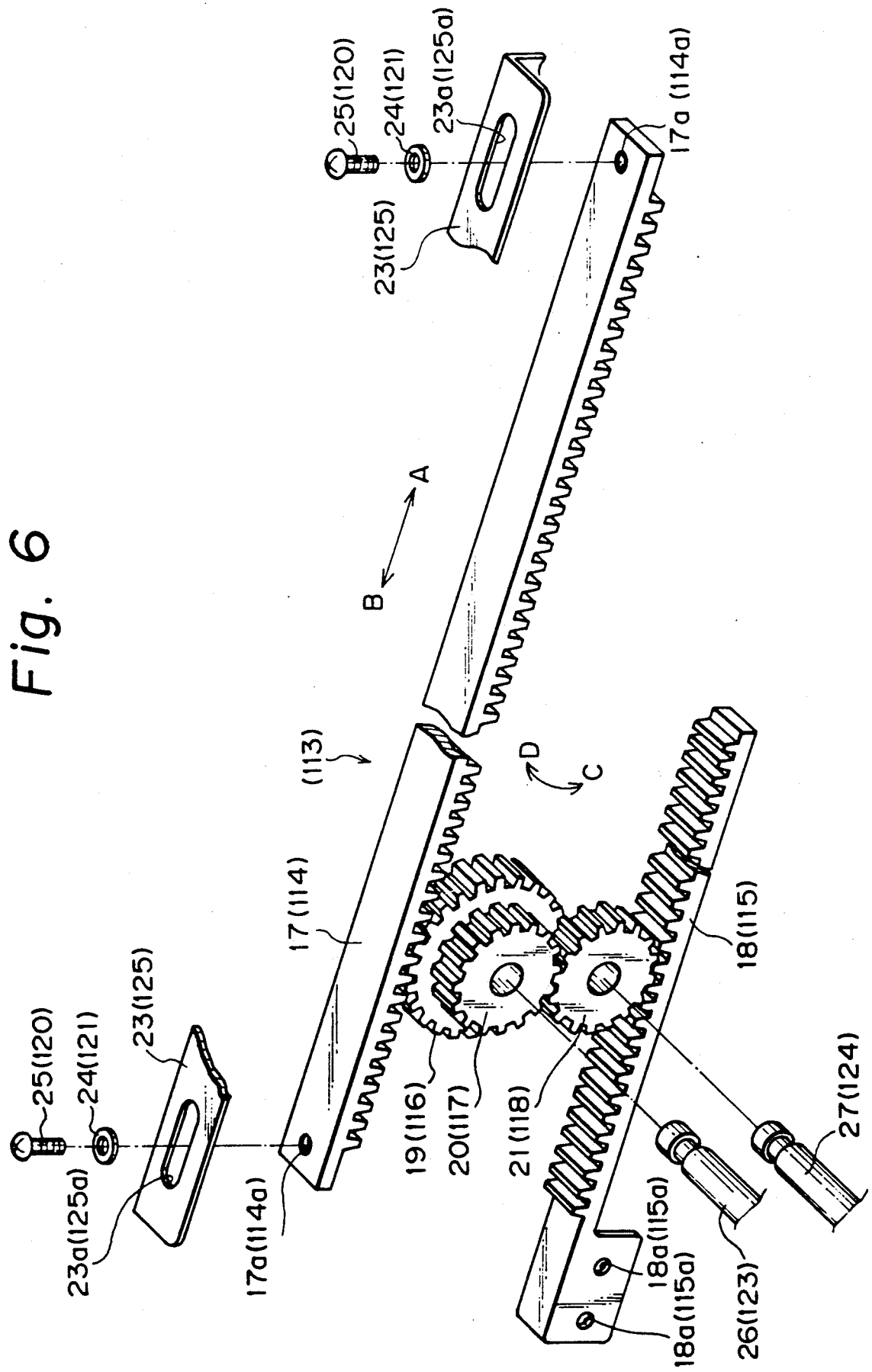
FIG. 6 is an explosive view of the main portion of the optical system of FIG. 5.

The driving mechanism 16 of this embodiment of the present invention comprises, as illustrated in FIG. 6, a fixed rack gear 17, a movable rack gear 18, a first large planetary gear 19, a second small planetary gear 20, an idle gear 21, and a drive gear 22 (FIG. 5).

The fixed rack gear 17 is secured to a frame 23 which is disposed under the original carrier 1 along the entire length thereof in such a manner that the teeth thereof is disposed downward, as illustrated in FIG. 6. The rack gear 17 has a screw hole 17a formed at each end thereof. Also, the frame 23 has a longitudinal hole 23a formed at each end thereof. The rack gear 17 is secured to the frame 23 in such a way that at each end thereof a screw 25 is screwed to the hole 17a of the rack 17 through the hole 23a of the frame 23 which is sandwiched between a washer 24 and the rack 17. The securing position of the rack 17 with respect to the frame 23 along the longitudinal direction thereof can be adjusted due to the longitudinal hole 23a of the frame 23.

On the other hand, the movable rack gear 18 which is shorter than the fixed rack gear 17 is disposed in parallel to the gear 17 with the teeth thereof arranged upward and movable in the longitudinal direction thereof. The gear 18 is fixed to the mirror base unit 10 by not shown screws through screw holes 18a formed at an end of the gear 18 in the mirror base unit side.

The planetary gears 19 and 20 and the idle gear 21 are interposed between the two rack gears 17 and 18. The planetary gears 19 and 20 are integrally combined together as one unit. The gear 19 engages with the rack 17. The idle gear 21 engages with the planetary gear 20 and the rack gear 18. The planetary gears 19 and 20 are installed on a rotary shaft 26. The idle gear 21 is installed on a rotary shaft 27. The rotary shafts 26 and 27 are secured to the lamp unit 7 through a not shown support member which is fixed to the lamp unit 7.

In accordance with the embodiment of the present invention, the ratio of the pitch circle diameter between the two planetary gears 19 and 20 is arranged as 2:1 which is the same as and corresponding to the ratio of the speed between the lamp unit 7 and the mirror base unit 10. For this purpose, in this embodiment, the ratio of the module between the two gears 19 and 20 is arranged as 2:1 while arranging that the number of the teeth of the gear 19 is the same as that of the gear 20.

The drive gear 22 is arranged to engage with the rack gear 18 and connected to a not shown drive motor to drive the gear 18.

The function of the above mentioned structure is described hereinafter.

The principle of the movement of the lamp unit 7 and the mirror base unit 10 is explained first.

Since the gear 19 engages with the rack gear 17 which is arranged unmovable, when the gear 19 is rotated by one turn in the direction of the arrow C, the shaft 26 of the gear 19 is shifted by the length of the pitch circle periphery of the gear 19 in the direction of the arrow A. Assuming that the module of the gear 19 is 1 and the tooth number thereof is 18, the shaft 26 is shifted by 18 $\pi$ in the direction of the arrow A according to one revolution of the gear 19.

On the other hand, with regard to the smaller planetary gear 20 which engages with the idle gear 21, the gear 20 is rotated by one turn according as the gear 19 is rotated by one turn, which results in that the moving length of the pitch circle periphery of the gear 20 becomes 9 $\pi$ since the module ratio between the gears 19 and 20 is 2:1 and the two gears have the same number of teeth. Accordingly, the idle gear 21 is rotated corresponding to the pitch circle periphery length 9 $\pi$ in the direction of the arrow D. The rotation of the gear 21 is transmitted to the rack gear 18. Thereby, the rack gear 18 is shifted in the direction of the arrow A by the length 9 $\pi$ which is the difference between the shifted length 18 $\pi$ of the lamp unit 7 to which the shafts 26 and 27 are connected in the direction of the arrow A and the reversely shifted length 9 $\pi$ of the idle gear 21 in the direction of the arrow B.

Accordingly, when the lamp unit 7 is moved at a speed of (v), the rack gear 18 is moved in the same direction as the lamp unit 7 at a speed of (v $\times$ 9 $\pi$/18 $\pi$), that is (v/2).

The exposure function of the optical system mentioned above is described below.

In the event of copying operation, the lamp unit 7 scans the original placed on the original carrier 1. In this scanning motion, the gear 22 rotates in the direction of arrow C, which drives the rack gear 18 to move in the direction of arrow A along with the mirror base unit 10. The motion of the rack 18 is transferred to the rotary shafts 26 and 27 and drives to rotate the shafts through the gears 19, 20 and 21. Therefore, the lamp unit 7 which is connected to the shafts 26 and 27 moves at a speed twice as the mirror base unit 10 in accordance with the gear arrangement mentioned above.

As mentioned above, the lamp unit 7 and the mirror base unit 10 can be driven to move at a predetermined speed ratio with respect to each other without using wires, which makes it possible to reduce the number of parts such as wires and pulleys and simplify the structure, making it easy to assemble and reducing the cost thereof.

The light output from the lamp 4 of the unit 7 is reflected by the original on the carrier 1 and propagates back through the mirrors 6, 8, 9, lens 11, mirrors 12, 13, 15 to the drum 2. The reflection light forms a electrostatic latent image on the drum 2 corresponding to the image of the original. The latent image is developed and transferred to a copy paper.

In accordance with the embodiment mentioned above, the focus adjustment, that is, the adjustment of the optical path length from the original carrier 1 to the lens 11 can be easily achieved by adjusting the position of the gear 17 with respect to the frame 23.

Figure 7:
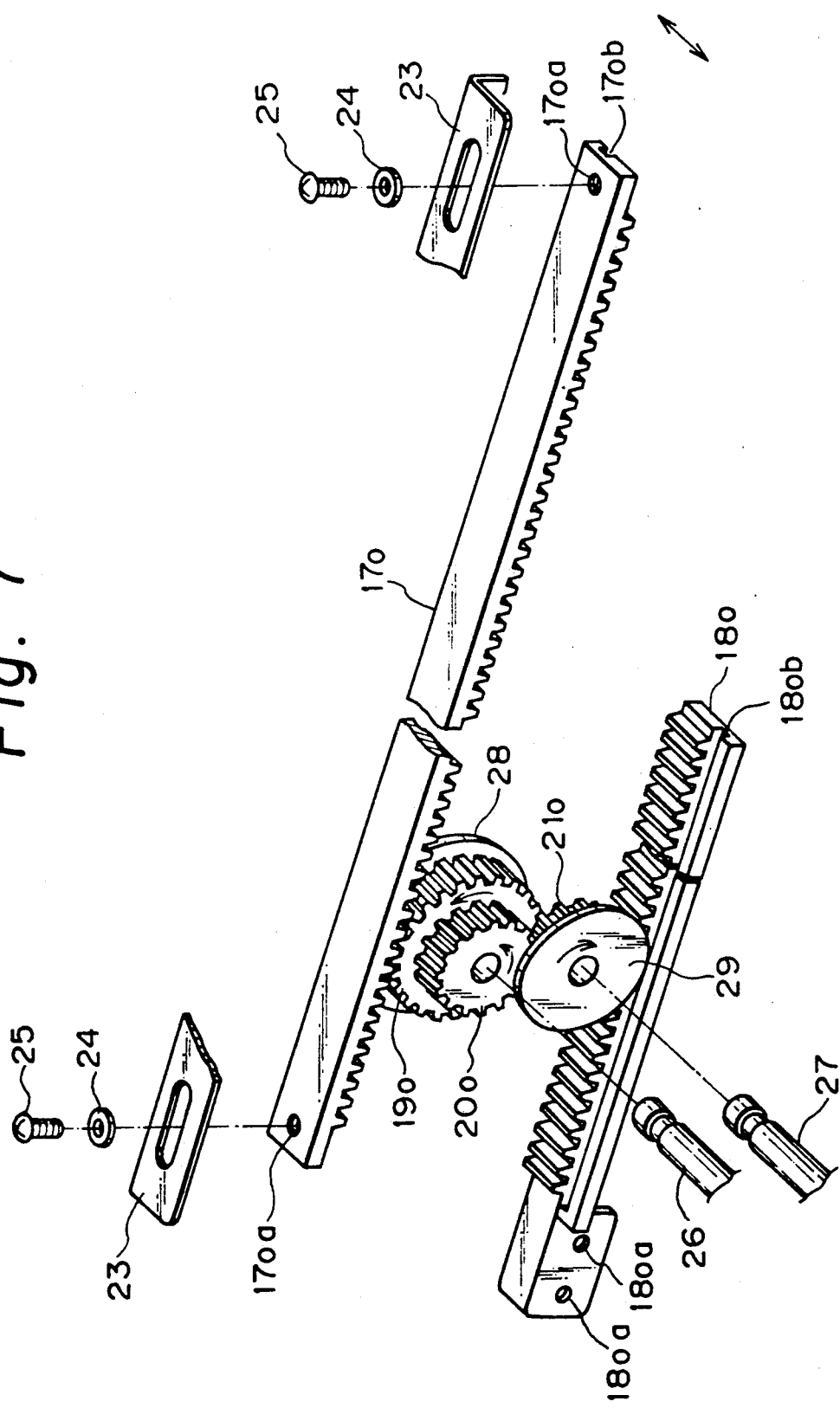
FIG. 7 is an explosive view of the main portion of the optical system in accordance with another embodiment of the present invention.

FIG. 7 is an explosive perspective view of another embodiment of the present invention illustrating the portion corresponding to that of FIG. 6. The same or corresponding parts are designated by the same numerals.

In this embodiment, the stationary rack gear $17_0$ has a guide groove $17_0b$ formed along the longitudinal side edge thereof and on the lower side thereof. Similarly, the movable rack gear $18_0$ has a guide groove $18_0b$ formed along the longitudinal side edge thereof and on the upper side thereof. Periphery of Guide discs 28 and 29 are fitted in the grooves $17_0b$ and $18_0b$, respectively, so that the discs are rotatingly moved along the guide grooves $17_0b$ and $18_0b$, respectively. The guide discs 28 and 29 are secured to the planetary gear $19_0$ and the idle gear $21_0$, respectively, so that the discs 28 and 29 rotate along with the gears $19_0$ and $21_0$, respectively.

Due to the arrangement of such a guide means, it becomes possible to avoid the dislocation of the lamp unit 7 and the mirror base unit 10 in the lateral direction with respect to the longitudinal direction of the racks $17_0$ and $18_0$ when the units 7 and 10 are driven to move along the longitudinal direction of the racks, respectively.

In this particular embodiment of FIG. 7, being differed from the arrangement of the embodiment of FIG. 6 mentioned above, the gear arrangement is such that the module of the gear $19_0$ is the same as that of the gear $20_0$ and that the ratio of teeth number between the gears $19_0$ and $20_0$ is set as 2:1 so that the ratio of the pitch circle diameter between the gears corresponds to the ratio of the speed between the units 7 and 10.

The other portions of the structure are substantially the same as those of the embodiment of FIGS. 5 and 6.

It is to be noted that the guide grooves may be formed in the side of gears $19_0$ and $20_0$ while forming guide projections mating with the grooves along the racks $17_0$ and $18_0$, respectively, instead of the structure mentioned above.

Figure 8:
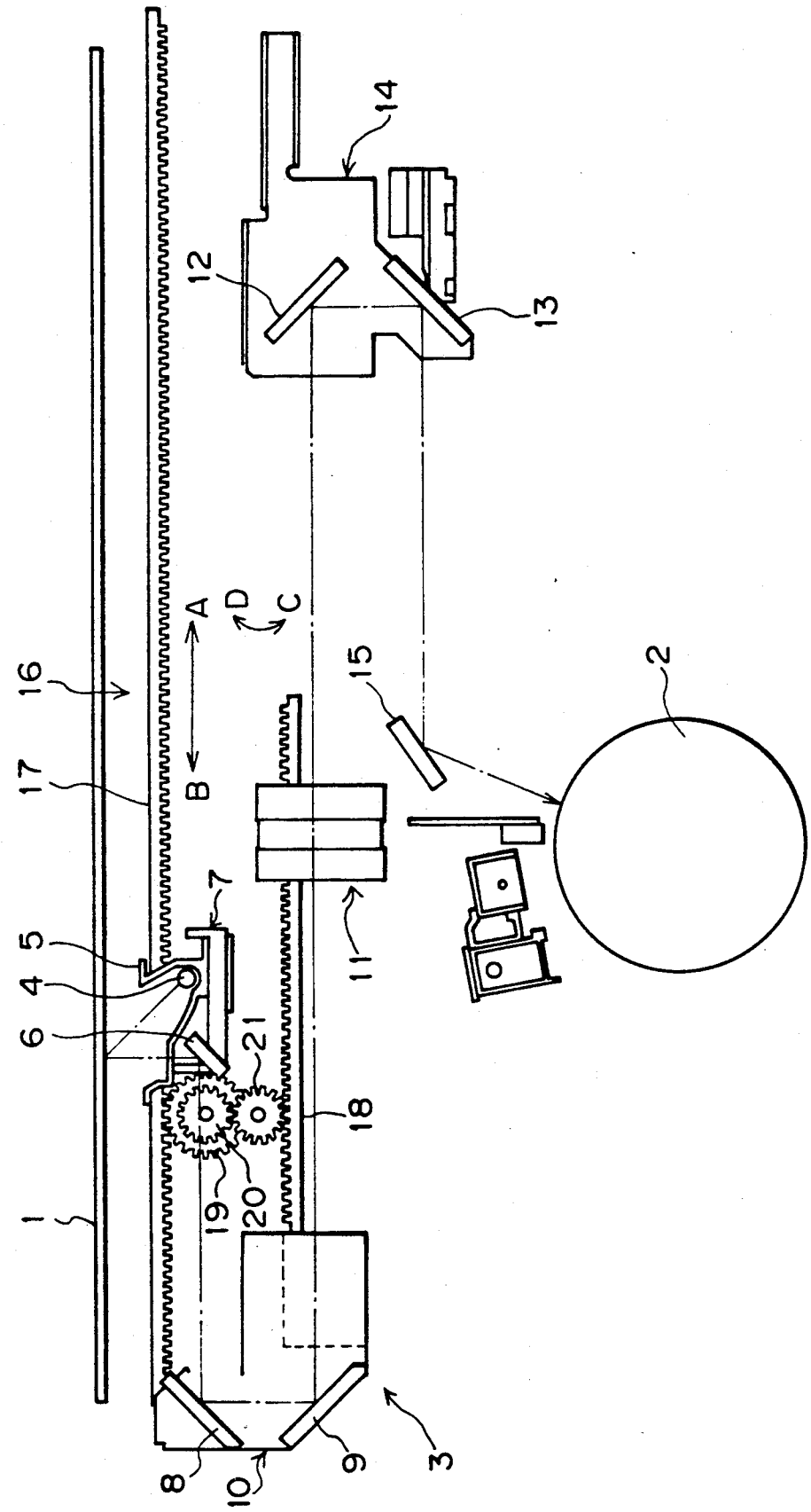
FIG. 8 is a constructional view of the optical system in accordance with still another embodiment of the present invention.
Figure 9:
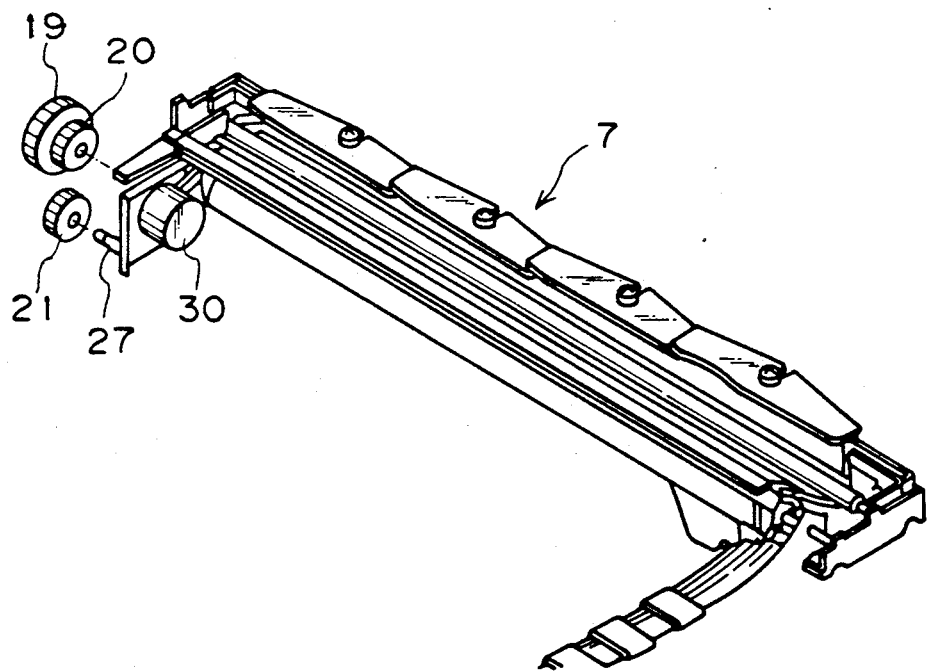
FIG. 9 is a perspective view of the light source lamp unit used in the optical system of FIG. 8

FIG. 8 is a constructional view of a still further embodiment of the present invention illustrating the portion corresponding to that of FIG. 5. Also, FIG. 9 illustrates the light source lamp unit used in the embodiment of FIG. 8.

In this embodiment, the drive gear 22 used in the above mentioned embodiments is deleted, instead a drive motor 30 is mounted on the lamp unit 7 to directly drive the gears 19 and 20.

The other portions of the structure are substantially the same as those of the embodiments mentioned above.

Figure 10:
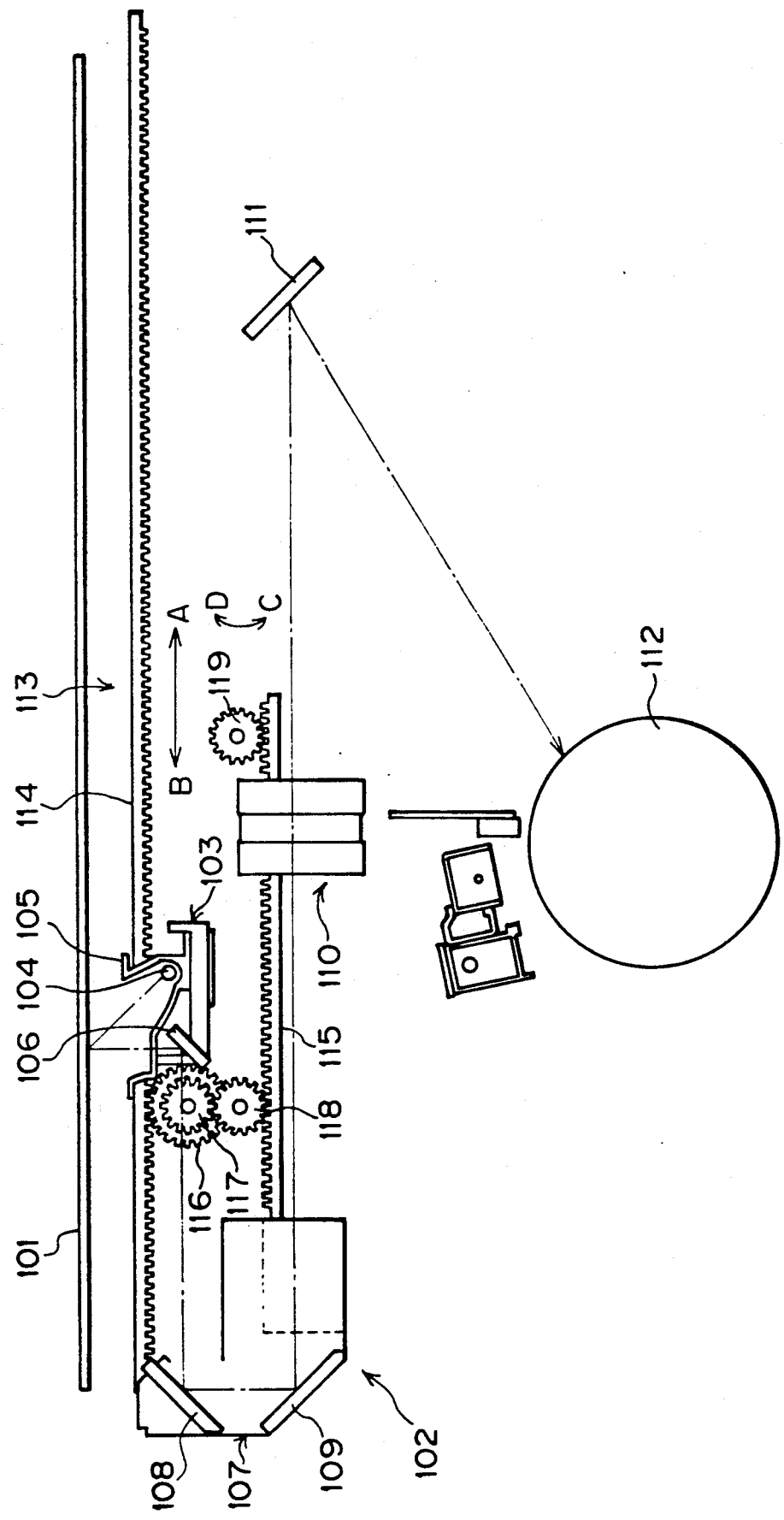
FIG. 10 is a constructional view of the optical system in accordance with a further embodiment of the present invention.

FIG. 10 illustrates a construction of a still further embodiment of the present invention.

An electrophotographic copying apparatus illustrated in FIG. 10 comprises an original carrier 101 on which an original to be copied is placed, and an optical system 102 disposed below the original carrier 101. The optical system 102 outputs an optical beam and scans the original placed on the carrier 101 and guides the reflection light reflected from the original to a photoconductor drum 112. The optical system 102 comprises a light source lamp unit 103 including a lamp 104, a reflection plate 105 and a first mirror 106, a mirror base unit 107 including a second mirror 108 and a third mirror 109, a fixed focal point type lens 110, and a fourth mirror 111.

The optical system 102 further comprises an optical system driving system 113 for driving the lamp unit 103 and the mirror base unit 107 at the time of scanning operation of the original. The mirror base unit 107 is arranged so that the unit 107 is driven to move in the same direction as the lamp unit 103 at a speed as half as the unit 103. The driving system 113 comprises a stationary rack gear 114, a movable rack gear 115, a first planetary gear 116 having a large diameter, a second planetary gear 117 having a small diameter, an idle gear 118; and a drive gear 119.

The arrangement of the rack gears 114 and 115 is substantially the same as that of FIG. 6. Numerals designating the embodiment of FIG. 10 are put in brackets in FIG. 6.

In the embodiment of FIG. 10, the gear ratio between the gears 116 and 117 is arranged as 2:1 and the gear ratio between the gears 117 and 118 is arranged as 1:1, respectively.

The drive gear 119 which engages with the rack gear 115 is connected to a not shown drive means so as to drive the gear 115.

In the assembling process of the optical system 102, the imaging optical path length from the lens 110 to the drum 112 is adjusted first to accord with the reference length, and after that, the optical path length from the original carrier 101 to the lens 110 is precisely adjusted.

In accordance with the structure mentioned above, the lamp unit 103 and the mirror base unit 107 are driven to move by the optical drive system 113 as follows.

The planetary gear 116 engages with the stationary rack gear 114 which is unmovable. Therefore, when the gear 116 turns by one revolution in the direction of arrow C, the rotary shaft 123 of the gear 116 moves in the direction of arrow A by the length of its pitch circle periphery. On the assumption that the module of the gear 116 is 1, and the number of teeth thereof is 36, the rotary shaft 123 moves by 36 $\pi$ toward the direction of arrow A for every one revolution of the gear 116.

The gear 117 which engages with the idle gear 118 also rotates by one revolution when the gear 116 is rotated by one revolution. Since the gear ratio between the gears 116 and 117 is 2:1 and the number of teeth of the gear 117 is 18, the pitch circle moving length of the gear 117 becomes 18 $\pi$. Therefore, the gear 118 rotates by the revolution corresponding to the length 18 $\pi$ in the direction of arrow D by one revolution of the gear 116. This revolution of the gear 118 is transmitted to the rack gear 115 so that the gear 115 is moved by the length 18 $\pi$ toward the direction of arrow B. That is, the gear 115 moves toward the direction of arrow A by the length 36 $\pi$ along with the lamp unit 3 and at the same time moves back toward the direction of arrow B by the length 18 $\pi$ by the function of the gear 118, which results in that the gear 115 moves by the length of 18 $\pi$ toward the direction of arrow A. Accordingly, if the lamp unit 103 moves at a speed of (v), the rack gerar 115 moves at a speed of (v $\times$ 18$\pi$/36 $\pi$), i.e., (v/2) toward the same direction as the unit 103.

An exposure operation by the optical system 102 is described below.

In the copying operation, the lamp unit 103 scans the original placed on the carrier 101. In this operation, the drive gear 119 is rotated in the direction of arrow C, by which the rack gear 115 is moved toward the direction of arrow A along with the mirroe base unit 107. The movement of the gear 115 is transmitted to the lamp unit 103 in the way mentioned above through the gears 16, 17 and 18 so that the lamp unit 103 moves at a speed twice as fast as the mirror base unit 107.

The light output from the lamp 104 of the unit 103 is reflected by the original. The reflection light is further reflected by the mirrors 106, 108 and 109, passes through the lens 110, further reflected by the mirror 111 and reaches the photoconductor drum 112. The reflection light forms an electrostatic latent image on the drum surface corresponding to the original image. The latent image is developed and transferred to a copy paper.

The optical path length from the original carrier 101 to the lens 110 can be precisely adjusted in such a way as described below.

First, the screws 120 (FIG. 6) which tie the rack gear 114 with the frame 125 are loosened. Next, the rack gear 114 is shifted toward either the direction of arrow A or B. For example, when the gear 114 is shifted by the length (l) toward the direction of arrow A, the planetary gears 116 and 117 are moved by the length (½) toward the direction of arrow A in accordance with the principle mentioned before, on the assumption that the rack gear 115 is fixed and stationary in this operation. Therefore, the length from the carrier 101 to the lens 110 becomes shorter by the length (l) due to the movement of the mirror base unit 107 by the length (½) toward the direction of arrow A. On the other hand, when the gear 114 is shifted toward the direction of arrow B by the same length, the length from the carrier 101 to the lens 110 becomes longer by the length (l).

As mentioned above, in accordance with the optical system driving means 113 of the present invention, it becomes possible to easily set the speed ratio between the units 103 and 107 by adjusting the gear ratio between the planetary gears 116, 117 and the idle gear 118. It also becomes possible to easily adjust the optical path length from the original carrier 101 to the lens 110, that corresponds to the focal length of the system, by adjusting the position of the rack gear 114 within the movable range of the longitudinal holes 125a, while observing the optical system 102.

Figure 11:
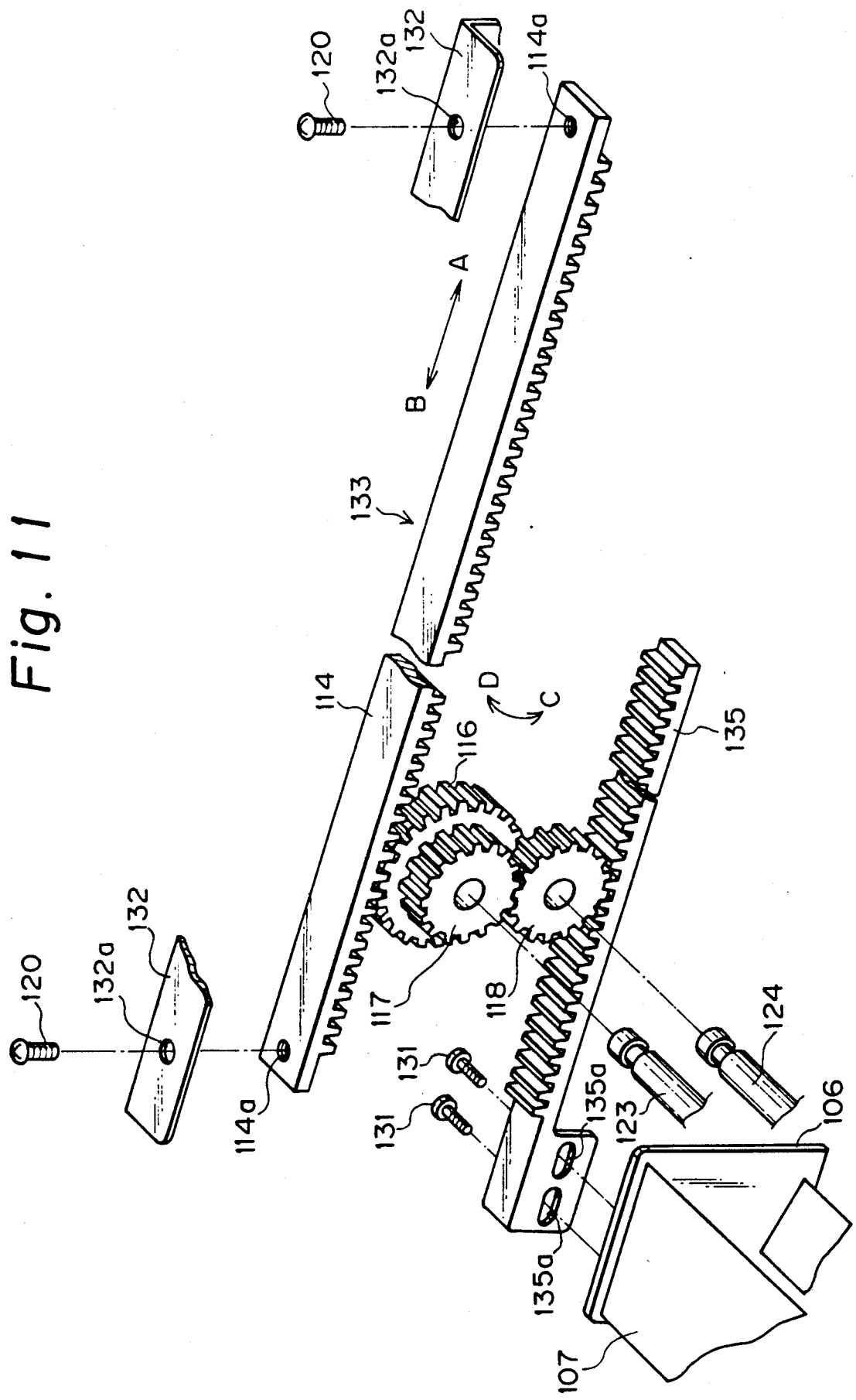
FIG. 11 is an explosive view of a main portion of the optical system in accordance with a still further embodiment of the present invention.

FIG. 11 illustrates a still further embodiment of the present invention. For the sake of clarifying the explanation, the same or corresponding parts are designated by the same numerals as the embodiments mentioned above.

As illustrated in FIG. 11, the optical system driving means 133 of this embodiment comprises a movable rack gear 135 which has two longitudinal holes 135a formed at an end portion thereof to which the mirror base unit 107 is to be connected. The gear 114 is attached to the unit 107 by means of screws 131 through the holes 135a. Therefore, the position of the rack gear 135 with respect to the unit 107 is adjustable along the longitudinal direction within the range of the longitudinal hole 135a. The driving means 133 also comprises a stationary rack gear 114 which is fixed to the device frame 132 at each end thereof by means of a screw 120 through a circular hole 132a. The other portions of the structure of this embodiment is substantially the same as those of the embodiment mentioned above with reference to FIGS. 6 and 10.

In accordance with the structure of FIG. 11 mentioned above, the optical path length from the original carrier 101 to the lens 110 can be adjusted as follows. First, the screws 131 which fasten the gear 135 to the unit 107 are loosened. Then the gear 135 is shifted toward the direction of arrow either A or B. For example, if the gear 135 is shifted toward the direction of arrow A by the length (½), the lamp unit 103 is moved toward the direction of arrow B by the length (l) in accordance with the principle of the gear motion of the invention mentioned before so that the optical path length from the original carrier 101 to the lens 110 becomes shorter by the length (l). On the other hand, if the gear 135 is shifted toward the direction of arrow B by the length (½), the lamp unit 103 is moved toward the direction of arrow A by the length (l) so that the optical path length from the original carrier 101 to the lens 110 becomes longer by the length (l).

As mentioned above, in accordance with the optical system driving means 133 of FIG. 11, it becomes possible to easily set the speed ratio between the units 103 and 107 and precisely adjust the optical length from the original carrier 101 to the lens 110, as in the case of the embodiment mentioned before.

FIG. 12 illustrates a still further embodiment of the present invention. It is to be noted that for the sake of simplifying the explanation, the same or corresponding parts of the embodiment is designated by the same numerals as the embodiments mentioned before.

As illustrated in FIG. 12, in accordance with the optical system driving means 143 of this embodiment, the structure is arranged in such a way that planetary gears 116 and 117 are installed on a rotary shaft 123 and an idle gear 118 is installed on a rotary shaft 124 and that the shafts 123 and 124 are secured to a support plate 141 which is attached to the lamp unit 103 by means of screws 142. Each screw 142 fastens the plate 141 to the unit 103 through a longitudinal hole 141a formed in the plate 141 so that the position of the plate 141 with respect to the unit 103 can be adjusted within the range of the longitudinal hole 141a. Other portions of the structure of this embodiment are substantially the same as those of the embodiments mentioned before.

The precice adjustment of the optical path length from the original carrier 101 to the lens 110 is performed as follows.

First, the screws 142 are loosened and the unit 103 is shifted with respect to the plate 141 toward the direction of either arrow A or B. For example, if the unit 103 is shifted toward the direction of arrow A by the length (l), the optical path length from the original carrier 101 to the lens 110 becomes longer by the length (l). On the other hand, if the unit 103 is shifted toward the direction of arrow B by the length (l), the optical path length from the original carrier 101 to the lens 110 becomes shorter by the length (l).

As mentioned above, in accordance with the optical system driving means 133 of the embodiment of FIG. 12, it becomes possible to easily set the speed ratio between the units 103 and 107 and adjust precisely the optical path length from the original carrier 101 to the lens 110.

Also, it may be arranged in such that the gears 116 and 117 are prepared as individual parts respectively so that after assembled within the device the gears are rotated with respect to each other to adjust the optical path length, and after that, the gears 116 and 117 are secured to each other, whereby the optical path length from the original carrier 101 to the lens 110 can be precisely adjusted. In such an arrangement, it is unnecessary to form the longitudinal holes 141a in the support plate 141.

FIG. 13 illustrates a further example of the planetary gear arrangement of the present invention. In this example, the gear 117 has a disc 144 attached thereto. The disc 144 has a longitudinal arc hole 144a. The gear 116 has a screw hole (not shown) corresponding to the hole 144a of the gear 117. The gears 116 and 117 are secured to each other by means of screw 145 which is screwed to the screw hole of the gear 116 through the longitudinal hole 144a of the gear 117. It is to be noted that the longitudinal hole 144a may be formed in the gear 116 side and the screw hole may be formed in the gear 117 side instead of the above mentioned arrangement.

In accordance with the above mentioned arrangement, it becomes possible to adjust the focal length of the optical system by rotating one of the gears 116 and 117 with respect to the other. For example, the gear 116 is rotated in the direction of arrow C with respect to the gear 117 and secured to the gear 117. By this manipulation, since the rack gear 114 is unmovable, the rotary shaft 123 of the gears 116 and 117 to which the unit 103 is connected is shifted toward the direction of arrow A by, for example, the length (l). Also, the gear 117 is being stationary, the idle gear 118 functions to move the gear 115 toward the direction of arrow A by the length (l). Thereby, the unit 107 is moved toward the same direction by the same length as the unit 103 so that the optical path length from the original carrier 101 to the lens 110 becomes shorter by the length (½).

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical system driving device comprising:
   a lamp unit which emits an optical beam for scanning an object and moves with respect to said object;
   a photosensitive member which receives a reflection light reflected from said object;
   a mirror unit which is disposed on an optical path between said lamp unit and said photosensitive member for guiding said reflection light to said photosensitive member and moves at a predetermined speed ratio with respect to said lamp unit; and
   a rack-pinion means connected to said lamp unit and said mirror unit to move said units at said predetermined speed ratio,
   said rack-pinion means comprising:
   a stationary rack gear secured to a device frame;
   a movable rack gear attached to said mirror unit;
   a first planetary gear which engages with said stationary rack gear;
   a second planetary gear which is coaxially secured to and rotates with said first planetary gear and which has a pitch circle diameter ratio corresponding to said speed ratio with respect to said first planetary gear;
   an idle gear which is disposed between and engages with said second planetary gear and said movable rack gear;
   a first rotary shaft on which said first and second planetary gears are installed; and
   a second rotary shaft on which said idle gear is installed, said first and second rotary shafts being secured to said lamp unit as a part thereof.

2. An optical system driving device according to claim 1, wherein said object to be scanned is an original which is to be copied and placed on an original carrier.

3. An optical system driving device according to claim 1, wherein said device frame has a longitudinal hole formed at a position corresponding to each end of said stationary rack gear so that said stationary rack gear is secured to said device frame by means of a screw through said longitudinal hole.

4. An optical system driving device according to claim 1, wherein one of said movable rack gear and said mirror unit has a longitudinal hole formed therein so that said movable rack gear is secured to said mirror unit by means of a screw through said longitudinal hole.

5. An optical system driving device according to claim 4, wherein said mirror unit has a support plate attached thereto, said longitudinal hole being formed in said support plate.

6. An optical system driving device comprising:
   a lamp unit which emits an optical beam for scanning an object and moves with respect to said object;
   a photosensitive member which receives a reflection light reflected from said object;
   a mirror unit which is disposed on an optical path between said lamp unit and said photosensitive member for guiding said reflection light to said photosensitive member and moves at a predetermined speed ratio with respect to said lamp unit; and
   a rack-pinion means connected to said lamp unit and said mirror unit to move said units at said predetermined speed ratio.
   said rack-pinion means comprising:
   a stationary rack gear secured to a device frame;
   a movable rack gear attached to said mirror unit;
   a first planetary gear which engages with said stationary rack gear;
   a second planetary gear which is coaxially secured to and rotates with said first planetary gear and which has a gear ratio different from that of said first planetary gear;
   an idle gear which is disposed between and engages with said second planetary gear and said movable rack gear;
   a first rotary shaft on which said first and second planetary gears are installed; and
   a second rotary shaft on which said idle gear is installed, said first and second rotary shafts being secured to said lamp unit as a part thereof.

7. An optical system driving device according to claim 6, wherein said object to be scanned is an original which is to be copied and placed on an original carrier.

8. An optical system driving device according to claim 6, wherein said device frame has a longitudinal hole formed at a position corresponding to each end of said stationary rack gear so that said stationary rack gear is secured to said device frame by means of a screw through said longitudinal hole.

9. An optical system driving device according to claim 6, wherein one of said movable rack gear and said mirror unit has a longitudinal hole formed therein so that said movable rack gear is secured to said mirror unit by means of a screw through said longitudinal hole.

10. An optical system driving device according to claim 9, wherein said mirror unit has a support plate attached thereto, said longitudinal hole being formed in said support plate.

* * * * *